(12) United States Patent
Simmons et al.

(10) Patent No.: US 8,295,199 B2
(45) Date of Patent: Oct. 23, 2012

(54) METHODS AND SYSTEMS FOR MAINTAINING DIVERSITY FOR TELECOMMUNICATION SERVICES

(75) Inventors: Jacqueline S. Simmons, Davie, FL (US); Charles Grafton, Lawrenceville, GA (US); Gerald Simoneaux, Jr., Kenner, LA (US); Teresa G. Phillips, Matthews, NC (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 847 days.

(21) Appl. No.: 11/861,583

(22) Filed: Sep. 26, 2007

(65) Prior Publication Data

US 2009/0080343 A1 Mar. 26, 2009

(51) Int. Cl.
*H04L 12/28* (2006.01)
(52) U.S. Cl. .......................... 370/254; 710/316; 379/242
(58) Field of Classification Search .................. 370/254; 716/2, 126; 707/102; 702/188; 379/414; 703/1; 705/7.13
See application file for complete search history.

(56) References Cited

U.S. PATENT DOCUMENTS

| | | | |
|---|---|---|---|
| 5,726,979 A * | 3/1998 | Henderson et al. | 370/254 |
| 6,802,044 B2 * | 10/2004 | Campbell et al. | 716/126 |
| 6,892,169 B1 * | 5/2005 | Campbell et al. | 703/1 |
| 7,164,888 B2 | 1/2007 | Zerressen | |
| 7,236,587 B2 * | 6/2007 | Zerressen | 379/414 |
| 8,060,394 B2 * | 11/2011 | Woodings et al. | 705/7.13 |
| 2007/0130192 A1 * | 6/2007 | Bolder et al. | 707/102 |
| 2008/0195355 A1 * | 8/2008 | Brandt et al. | 702/188 |

* cited by examiner

*Primary Examiner* — Robert Wilson
*Assistant Examiner* — Lionel Preval
(74) *Attorney, Agent, or Firm* — Parks IP Law LLC; Jennifer P. Medlin, Esq.

(57) ABSTRACT

Diversity among telecommunications circuits is maintained by analyzing factors including whether synchronization leads are shared by diverse circuits, whether violations of diversity are brought about by new orders that have been placed, and whether improper personnel have been assigned to monitor diverse circuits. Diversity is further maintained by reporting within a graphical user interface those circuits that are subject to diversity and reporting violations of diversity that exist for those circuits. The graphical user interface may provide various controls for dictating which violations are displayed for which circuits. Additionally, diversity is maintained by providing search options that allow the circuits subject to diversity to be narrowed depending upon user-specified criteria.

12 Claims, 9 Drawing Sheets

| LOCATION | EQUIPMENT IDENTIFIER | SYNCH LEAD |
|---|---|---|
| CO - 1 | EQUIPMENT ITEM - 1 | SL - 1 |
| CO - 1 | EQUIPMENT ITEM - 2 | SL - 2 |
| CO - 1 | EQUIPMENT ITEM - 3 | SL - 2 |
| CO - 1 | EQUIPMENT ITEM - 4 | SL - 1 |

FIG. 2

| CIRCUIT IDENTIFIER | EQUIPMENT IDENTIFIER |
|---|---|
| C - 1 (C - 2) | CO - 1:  ITEM 2<br><br>CO - 2:  ITEM 4<br><br>CO - 8:  ITEM 1 |
| C - 2 (C - 1) | CO - 3:  ITEM 5<br><br>CO - 7:  ITEM 6<br><br>CO - 8:  ITEM 1<br><br>CO - 1:  ITEM 3 |

FIG. 3

Circuit List for Global Search
All States -- All Types -- Equipment Search  502
HECIG:T1MBZ111, Relay Rack:00103, Office: ATLNGAEL
Top of Report  ☐ Scrollbars  Excluded CktIDs Circuit Details
Ckt: 000/DF-SLBZQA1 /AGSTGA331MD / 77 / ATLNGATH21W  510
CAC: MWT2EL7  522
☑ Violations Only

| CAC 504 | Ckt ID 506 508 | Stat | | Row | Equipment 512 | Flag 514 | EqpCAC 516 | LnT 518 | Equipment/Facility 520 | Site |
|---|---|---|---|---|---|---|---|---|---|---|
| CCS7 | | | | | | | | | | |
| MWT2EL7 | 000/DF-SLBZQA1 /AGSTGAJJ1MD/77/ATLNGATH21W | RE | | 1 | EXCLUDE | 4 | CQF2KB5 | EU | T1MBZ111 00103.08 ATLNGAELK01 | GA |
| MWT2DX8 | 001/DF-SLBZQA1 /AGSTGAJJ1MD/77/ATLNGATH21W | RE | | 2 | EXCLUDE | 5 | CQF2KB5 | EU | T3MA1BMB 00107.07 ATLNGAELK12 | GA |
| MWT2EB7 | 002/DF-SLBZQA1 /AGSTGAJJ1MD/77/ATLNGATH21W | RE | | 3 | EXCLUDE | 7 | CQF2KB5 | EU | T3MA1AMB 01125.17 ATLNGATHK12 | GA |
| MGJ2SZ8 | 001/DF--SLA/ALBYGAMA45A/77/ATLNGATH33W | RE | | 4 | EXCLUDE | 8 | CQF2KB5 | EM | D4CB03JB 02208.10 ATLNGATH | GA |
| MGJ2TA2 | 003/DF--SLA/ALBYGAMA45A/77/ATLNGATH33W | RE | | 5 | EXCLUDE | 9 | CQB2QP2 | EU | T3MA2D6C 00107.08 ATLNGAELK12 | GA |
| MUT2ZW3 | 000/DF--SLBZQA1/ATLNGACSHMD/777/GNVLSCDT21W | RE | | 6 | EXCLUDE | 15 | CQB2QP2 | EM | T3MA2C6C 01125.16 ATLNGATHK12 | GA |
| MRC2BP6 | 000/DF--SLA/ATLNGATH21W/77/OMEGGAXA31W | RE | | 7 | EXCLUDE | 16 | CQA2EM3 | EM | SNMASEP5 01131.29 CNYRGAMA | GA |
| MKJ2RG2 | 000/DF--SLA/ATLNGATH21W/77/OMEGGAXAGTO | RE | | 8 | EXCLUDE | 18 | CQA2EM3 | EM | SNMASEP5 01123.39 PANLGAMA | GA |
| MLK2SK5 | 000/DF--SLA/ATLNGATH21W/77/STMYGAZA01T | RE | | 9 | EXCLUDE | 21 | CQA2EL9 | EM | SNMASEG5 01123.39 PANLGAMA | GA |
| MGK2JC4 | 000/DF--SLA/ATLNGATH34W/77/MACNGAMT75A | RE | | 10 | EXCLUDE | 23 | CQA2EL9 | EM | SNMASEG5 01112.06 ATLNGAEL | GA |
| E911 Message | | | | 11 | EXCLUDE | 26 | CQA2EL8 | EM | SNMASEG5 01112.06 ATLNGAEL | GA |
| MFX2MH4 | 1/AF54ES /ATLNGACD28F/7-/ATLNGAFP12T | GA | | 12 | EXCLUDE | 28 | CQA2EL8 | EU | SNMASEP5 02254.04 ATLNGATH | GA |
| MEX2MH6 | 3/AF54ES /ATLNGACD28F/7-/ATLNGAFP12T | GA | | 13 | EXCLUDE | 29 | CQA2FJ9 | EM | SNMASEG5 00003.20 ATLNGAIC | GA |
| MFW2MH3 | 2/PH54ES /ATLNGACD28F/7-/ATLNGAPP12T | GA | | 14 | EXCLUDE | 32 | CQA2FJ9 | EM | SNMASEP5 01131.29 CNYRGAMA | GA |
| MFW2HA2 | 2/AF54ES /CNYRGAMA48F/7-/ATLNGAPP12T | GA | | 15 | EXCLUDE | 33 | CQA2EM2 | EM | SNMASEP5 00003.20 ATLNGAIC | GA |
| MFW2HA3 | 3/AF54ES /CNYRGAMA48F/7-/ATLNGAPP12T | GA | | 16 | EXCLUDE | 35 | CQA2EM2 | EM | SNMASEP5 02254.04 ATLNGATH | GA |
| MFW2WY2 | 1/DF54ES /CVTNGAMT78C/7-/WTVLGAES11T | GA | | 17 | EXCLUDE | 37 | CQH2ZM7 | EU | T1MAZU2L 03308.08 AGSTGAMTK01 | GA |
| MGH2XD6 | 1/DF54ESZSCCR /CVTNGAMT78C/7-/WTVLGAES11T | GA | | 18 | EXCLUDE | 40 | CQH2ZM7 | EM | T3MA2ERE 00103.07 ATLNGAELK01 | GA |
| MGH2WY4 | 3/DF54ES /CVTNGAMT78C/7-/WTVLGAES11T | GA | | 19 | EXCLUDE | 41 | CQJ2AF6 | EM | T3MA2E1E 00103.07 ATLNGAELK01 | GA |
| MGH2XD8 | 3/DF54ESZSCCR /CVTNGAMT78C/7-/WTVLGAES11T | GA | | 20 | EXCLUDE | 42 | CQJ2AF6 | EM | T3MA2C6C 00107.05 ATLNGAELK12 | GA |
| MGH2XB7 | 6/DF54ES /CVTNGAMT78C/7-/WTVLGAES11T | GA | | 21 | EXCLUDE | 59 | CQB2VM4 | EU | T3MA2D6C 00107.08 ATLNGAELK12 | GA |
| E911 Special | | | | 22 | EXCLUDE | 60 | CBA4WK5 | EM | SNMASEG5 01102.00 AGSTGAFLHS1 | GA |
| SDD2ZS7 | 50/EMNZ/502252/SB/ /ALBYGAMA13T/--/CLMBGAMT | RE | | 23 | EXCLUDE | 69 | CBA4WK5 | EM | SNMASEP5 01124.20 VDALGAMAHS1 | GA |
| SFZ2C9 | 20/HPHZ/501444/SB/ APEXNCCE /--/MIAMFLCCH02 | RE | | 24 | EXCLUDE | 77 | CBA4WL6 | EM | SNMASEP5 01121.12 MACNGAGPHS1 | GA |
| SLS2N24 | 40/HPHZ/509951/SB/ /ATLNGAEL /--/MIAMFLCCH02 | RE | | 25 | EXCLUDE | 79 | CBA4WL6 | EM | SNMASEP5 05559.12 MACNGAMTHS1 | GA |
| SMS2WG6 | 40/HRXZ/508562/SB/ /ATLNGAEL /--/MIAMFLCCH02 | RE | | 26 | EXCLUDE | 84 | CBA4WL7 | EM | SNMASEP5 05502.06 ATLNGACHHS1 | GA |
| SLT2NS6 | 40/EMXX/500918/SB/ /ATLNGAFP /--/ATLNGAEL | GA | | 27 | EXCLUDE | 88 | CBA4WK7 | EM | SNMASEG5 05559.12 MACNGAMTHS1 | GA |

METHODS AND SYSTEMS FOR MAINTAINING DIVERSITY FOR TELECOMMUNICATION SERVICES

TECHNICAL FIELD

Embodiments are related to circuit diversity within a telecommunications network. More particularly, embodiments are related to maintaining such circuit diversity.

BACKGROUND

Telecommunications networks establish a very high number of individual circuits. The telecommunications network may connect an end user site to a switch that connects the end user site to another end user site at the request of either of the end user sites, such as in the case of conventional telephone calls. The telecommunications network may also permanently connect an end user site to another end user site such as to establish a dedicated communication channel for exchanging data.

It may be desirable to provide diversity between two or more circuits within a telecommunications network. For example, an end user may require redundant circuits to ensure that if one circuit goes down, the other remains available. Banks, emergency services, and the like are examples of such entities. By maintaining circuit diversity, the likelihood of the back-up circuit being available even when the primary circuit has failed is higher because the source of the failure is likely to be isolated from the backup circuit. Thus, maintaining circuit diversity requires that the telecommunications provider prevent circuits that are to be diverse from one another from sharing a common point of potential failure.

The task of maintaining circuit diversity is a difficult one. The elements that factor into maintaining diversity include the immense number of telecommunications circuits that exist, the immense number of locations where failures for a given circuit may occur, the large numbers of circuits that may need to have diversity relative to one or more other circuits, and the high frequency of changes occurring with the telecommunications network due to orders for new circuits, cancellation of circuits, repairs of circuits, and so forth.

SUMMARY

Embodiments address issues such as these and others by providing tools for analyzing and reporting whether violations of diversity have occurred within a telecommunications network. The violations may come about in several different manners such as having common equipment between circuits, common timing leads between equipment establishing the circuits, improper personnel assigned to monitor the diverse circuits, and so on. When one of those violations is found, it may be recorded in the system and/or reported to a user. The reporting of violations may be provided through a graphical user interface, where users may perform searches based on various searching criteria. The violations may be displayed in response to selection of links within a circuit listing being displayed so that a user can examine a circuit of interest and can visualize where each diversity violation has occurred for that circuit.

Embodiments provide computer readable media containing instructions thereon for performing acts to assist in maintaining diversity for telecommunications services. The acts include tracking an association of each synchronization lead to a plurality of telecommunications circuits. The acts further include determining whether a first circuit and a second circuit of a diverse pair of the plurality are both associated to a same synchronization lead. An output indicator that represents whether the first circuit and the second circuit of the diverse pair are both associated to the same synchronization lead is then produced.

Embodiments also provide computer readable media containing instructions thereon for performing other acts to assist in maintaining diversity for telecommunications services. The acts include tracking an association of each item of telecommunications equipment to the plurality of telecommunication circuits and determining whether a first circuit and a second circuit of a diverse pair of the plurality are both associated to same items of equipment. The acts further include displaying within a graphical user interface a list of the plurality of telecommunications circuits and a control for each circuit in the list to show circuit details and receiving a selection of the control for the first circuit. In response to receiving the selection, a list of the items of equipment that are associated to both the first and second circuits is displayed.

Embodiments provide methods of maintaining diversity for telecommunications services. A method involves tracking an association of each item of telecommunications equipment to the plurality of telecommunication circuits, including tracking equipment types, facility types, circuit identifiers, and office locations. The method further involves determining whether a first circuit and a second circuit of a diverse pair of the plurality are both associated to same items of equipment. Search criteria are received within a graphical user interface, and the search criteria includes at least one of equipment type, facility type, circuit identifier, and office location. Additionally, the method involves displaying within the graphical user interface a list of the plurality of telecommunications circuits that correspond to the search criteria, where the list includes the first and the second circuits and where the display indicates which items of equipment are associated to both the first and second circuits.

Embodiments provide computer systems for maintaining diversity for telecommunications services that includes a storage device containing associations of items of equipment to a plurality of telecommunications circuits that include a first circuit and a second circuit of a diverse pair. The computer systems further include an external interface to an external system that tracks orders for telecommunications circuits and a processor that monitors the external system via the external interface. The processor detects new orders for circuits other than the first and second circuits where the new orders result in changes to the associations of the items of equipment to the first and second circuits of the diverse pair. The processor detects whether the changes resulting from the detected new orders create an association of a first item of equipment to both the first and second circuits. The processor then outputs an indicator that the new order creates an association of the first item of equipment to both the first and second circuits.

Embodiments also provide computer systems for maintaining diversity for telecommunications services that includes other elements. The computer systems include a storage device containing associations of items of equipment to a plurality of telecommunications circuits that include a first circuit and a second circuit of a diverse pair. The computer systems include an external interface to an external system that tracks an association of personnel responsible for monitoring to telecommunications circuits to be monitored. The personnel include diversity personnel responsible for monitoring circuits that require diversity and non-diversity personnel responsible for monitoring circuits that do not require diversity. A processor monitors the association of the personnel to the first and second circuits and detects when a non-diversity person is associated with either the first or second circuits. Upon detecting the association of the non-diversity person to the first or second circuits, the processor then changes the association to replace the non-diversity person with a diversity person.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 2 shows an example of database organization for tracking synchronization leads among equipment according to various embodiments.

FIG. 3 shows an example of database organization for tracking equipment among circuits according to various embodiments.

FIG. 5 shows an example of a graphical user interface that displays circuits of interest and violations for a selected circuit according to various embodiments.

FIG. 7 shows an example of a graphical user interface that displays the search fields for each of the various criteria that may be used to search the communications circuits that are subject to diversity according to various embodiments.

DETAILED DESCRIPTION

Embodiments allow for the analysis and/or reporting of diversity violations within telecommunication networks. The various manners in which diversity violations might occur may be analyzed and tracked. Diversity violations may also be reported to users via a graphical user interface by providing controls that the user may select to view those violations for circuits of interest. Furthermore, users may search for circuits of interest that are subject to diversity by interacting with a graphical user interface that specifies search categories and receives corresponding search criteria from the users.

Figure 1:
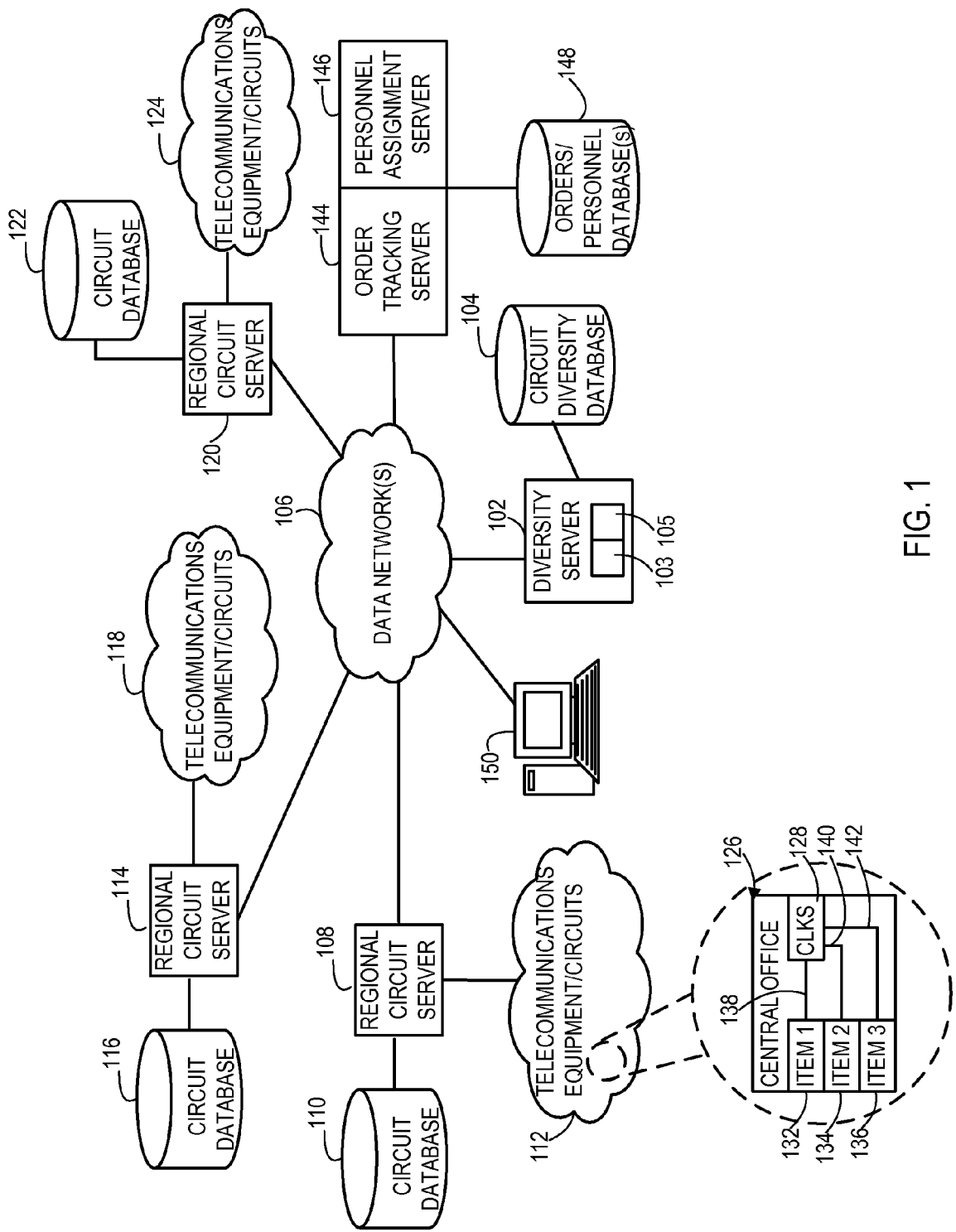
FIG. 1 shows an example of an operating environment for maintaining diversity of communications circuits according to various embodiments.

FIG. 1 shows an example of an operating environment for a diversity maintenance tool implemented by a diversity server 102. In this environment, a telecommunications network to be monitored may include various groupings of telecommunication equipment and resulting circuits. In this example, a first region includes a network 112 including telecommunications equipment and circuits being established. Similarly, a second region includes a network 118 while a third region includes a network 124. This number of regions is shown only for purposes of illustration and it will be appreciated that any number of regions including only a single region may be applicable One or more server computers may manage the equipment and circuits being provisioned within the networks 112, 118, and 124. A first regional circuit server 108 manages the equipment and services of the first network 112. This regional circuit server 108 may maintain information within a circuit database 110 which may contain the definitions of the circuits by storing associations of equipment ports to a circuit. When data is to be transferred via a circuit, the data may traverse from a port of one item of equipment at one location to a port of another item of equipment at the same location or at distant locations. A second regional circuit server 114 and a corresponding circuit database 116 may manage the second network 118 while a third regional circuit server 120 and a corresponding circuit database 122 may manage the third network 124.

An example of a given physical location of the first network 112 is also shown. This particular location includes a central office 126 that includes equipment to connect nearby end user locations into the telecommunications network 112 and in some cases, to create permanent circuits between end user locations. In this example, three items of equipment 132, 134, and 136 are shown. These items of equipment 132, 134, and 136 include many ports for sending and receiving communication signals that include data and/or voice. At least some of the circuits established through the network 112 are at least partially provisioned by one or more of these items of equipment 132, 134, and 136 of this central office 126.

These items of equipment 132, 134, and 136 require a synchronization signal to operate properly when sending and receiving communication signals. One or more synchronization clocks 128 may be present to provide such synchronization signals to each of the pieces of equipment. A synchronization lead 138, 140, 142 provides the synchronization signal from the clock 128 to the corresponding item of equipment 132, 134, and 136.

The regional circuit servers 108, 114, and 120 may communicate with other servers of a service provider via interconnecting data networks 106. For example, various centralized functions may be performed by such servers. Examples of centralized functions may include tracking for orders related to circuits, management of personnel responsible for the circuits, and the maintenance of diversity for those circuits requiring diversity.

For a given telecommunication network, an order tracking server 144 may be included to receive new orders that have been placed by customers and track the progress of implementing the order within the telecommunication network. Furthermore, the order tracking server 144 may notify other servers and systems of the orders and resulting changes to the circuits of the telecommunication network. A new order may request one or many things. For example, a new order may request that a new circuit be established between two end user sites, may request that an existing circuit be removed or enhanced, and so forth. The order tracking server 144 may maintain orders within databases 148 to track the orders.

A personnel assignment server 146 may be included to assign and track the responsibility for monitoring and managing circuits that have been created within the telecommunications network. The personnel assignment server 146 may communicate with the personnel as well as with other servers to provide notifications of the assignment of the personnel to the circuits. The personnel assignment server 146 may also maintain databases, such as the databases 148, to track the personnel assignments. Functions such as the order tracking and personnel assignment may be integrated within a single server and/or the database 148.

In addition to these centralized functions, the diversity server 102 may be present to perform the diversity analysis and reporting. The diversity server 102 may communicate with other servers through the data networks 106 to obtain the information that is analyzed to find the diversity violations and report them. For example, the diversity server 102 may periodically poll the regional circuit servers 108, 114, and 120 for data pertaining to the circuits that should have diversity. A diversity server 104 may maintain information that has been accumulated from polling external servers and databases and maintain the definitions of circuits requiring diversity.

According to exemplary embodiments, the diversity server 102, as with the other servers, is a computer system that includes the conventional components of a computer. Among those components, the diversity server 102 includes a processor 103 that implements various logical operations to perform functions including the diversity analysis and reporting. The processor 103 may be of various forms such as a general purpose programmable processor, an application specific processor, hard wired digital logic, and combinations thereof. The processor may utilize a memory 105 to store data as well as programming.

The processor 103 and memory 105 are examples of computer readable media which store information that when performed implement various logical operations. Such computer readable media may include various storage media including electronic, magnetic, and optical storage.

The diversity server 102 has one or more external interfaces to the other servers by way of data connections. The data connections may include a connection through the data networks 106 as shown by utilizing conventional networking connectivity. Such connectivity may include wired connections such as Ethernet, wireless connections such as Wi-Fi, and the like. The diversity server 102 may alternatively have external interfaces in the form of direct peer-to-peer connectivity to one or more external servers or data sources. Such peer-to-peer connectivity may also be in the form of wired or wireless connections using Ethernet, Wi-Fi, and the like.

A user terminal 150 is also present within the operating environment to allow a user to interface to the diversity server 102 to initiate a diversity analysis and/or to request and receive diversity reports. The user terminal 150 may be a personal computer with network connectivity or with a direct peer-to-peer connectivity to the diversity server 102. The user terminal may receive information from the diversity server 102 in one or more various ways. For example, the user terminal 150 may be implementing a web browser that receives web formatted information from the diversity server 102. As another example, the user terminal 150 may receive displays of information through a terminal services session and or similar remote access method.

FIG. 2 shows an exemplary embodiment of the contents of a database 200 for maintaining information about equipment of the telecommunications networks, and particularly, information regarding the synchronization leads being used for various items of equipment. This database 200 may be maintained by the regional circuit servers 108, 114, and 120. The diversity server 102 may also poll for this information and store a local copy in the circuit diversity database 104 for entries that pertain to circuits that should be diverse.

As shown, the database 200 includes a first column 210 that identifies the location of the equipment. In this case, all items of equipment within this portion of the database 200 are present at a central office labeled CO-1. In a second column 212, the database 200 identifies the equipment present at the locations. In a third column 214, the database 200 identifies the synchronization leads in use by the items of equipment. It will be appreciated that the labels used herein to identify the location, the equipment, and the synchronization leads are simplified for purposes of illustration.

A first row 202 shows that at a location CO-1, item 1 is present and utilizes a synchronization lead SL-1. A second row 204 shows that at the location CO-1, item 2 is present and utilizes a synchronization lead SL-2. A third row 206 shows that at location the CO-1, item 3 is present and also utilizes the synchronization lead SL-2. A fourth row 208 shows that at the location CO-1, item 4 is present and also utilizes the synchronization lead SL-1.

In this example, the database 200 does not directly associate the synchronization leads of the column 214 to circuits that have been defined. One objective may be to maintain diversity of two or more particular circuits by having no common synchronization lead for them. Thus, the synchronization leads present for the circuits are determined to analyze whether the diversity of the synchronization leads is present for the diverse circuits of interest. Where the database 200 does not directly associate the synchronization leads to the circuits, then the equipment present for the circuits is found and then the synchronization leads for that equipment is looked up in database 200.

As illustrated in FIG. 3, an exemplary embodiment of a database 300 defines the circuits by specifying the equipment being used to establish the circuit. In this example, the database 300 sets forth the identifier of the circuit in a column 302 and then sets forth the equipment used for that circuit in a column 304. As noted above, the labels used in this example are simplified for purposes of illustration. For example, in the column 304, the equipment identifier labels specify the location and name of the equipment using the simplified labels also used in FIG. 2. Furthermore, specific details such as the port of the item of equipment being used for the circuit are not specified in this example but may also be specified when appropriate.

In a first row 306, the database 300 specifies that a circuit C-1 utilizes the item 2 from the CO-1, utilizes an item 4 from the CO-2, and utilizes an item 1 from a CO-8. The row 306 also specifies that the circuit C-1 should be diverse from a circuit C-2 as indicated in column 302 by the parentheses. In a second row 308, the database 300 specifies that the circuit C-2 utilizes an item 5 of a CO-3, utilizes an item 6 of a CO-7, utilizes an item 1 of a CO-8, and utilizes the item 3 of the CO-1.

Figure 4:
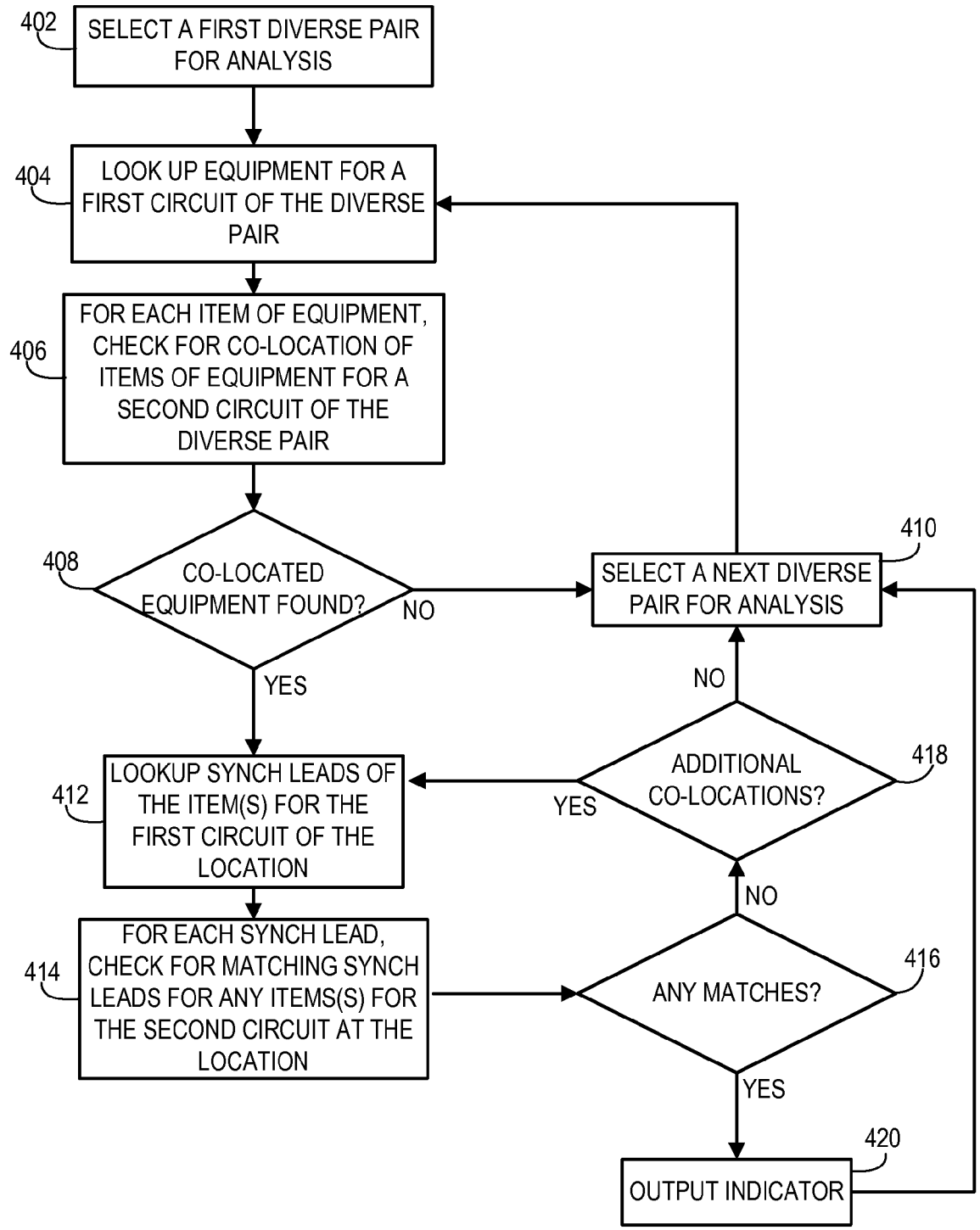
FIG. 4 shows an example of logical operations that may be performed to detect diversity violations due to shared synchronization leads according to various embodiments.

FIG. 4 shows an example of logical operations that may be performed by the processor 103 of the diversity server 102 to detect violations of diversity due to a common synchronization lead. At a selection operation 402, the processor 103 selects a first diverse pair for analysis, such as the C-1:C-2 pair. The processor 103 then looks up the equipment for the first circuit of the diverse pair, e.g., C-1, at a look-up operation 404. For each item of equipment that is present for this first circuit, the processor 103 then checks for co-located items of equipment for a second circuit of the diverse pair, e.g., C-2 at a comparison operation 406.

The processor 103 detects whether any co-located equipment is found between the first circuit C-1 and the second circuit C-2 at a query operation 408. Co-located equipment is of significance because if the circuits do not have equipment at the same location, then no synchronization leads would be common to both circuits. Thus, if the processor 103 finds that there are no co-located items of equipment between the circuits of the diverse pair, then the processor 103 selects a next diverse pair for analysis at a selection operation 410 and operational flow returns to the look-up operation 404.

Where the processor 103 does detect that there are co-located items of equipment for the diverse circuits being considered, then the processor 103 looks-up the synchronization leads of the items of equipment for the first circuit C-1 of the current location of interest at a look-up operation 412. For example, as shown in FIGS. 2 and 3, the C-1:C-2 pair includes common locations CO-1 and CO-8. Reviewing CO-1, it can be seen that C-1 uses SL-2 via the item 2. Then for each synchronization lead that is present for the first circuit C-1 at this current location, the processor 103 then checks for matching synchronization leads for any items of equipment for the second circuit C-2 at this current location at a check operation 414. As shown in FIGS. 2 and 3, reviewing CO-1 shows that C-2 uses SL-2 via the item 3. The processor 103 detects whether any matches of the synchronization leads have been found at a query operation 416. If matches are found, then the processor 103 outputs an indicator of the match at an output operation 420. In this case, C-1 and C-2 both utilize SL-2 at CO-1. Thus, there is a match, and an indicator is output to reflect that match.

The output indicator may be of various forms. For example, the indicator may be a flag that is output to the diversity database 104 to flag the circuits C-1 and C-2 as having a diversity violation due to a common synchronization lead. As discussed below, the violation of diversity may then be reported to personnel, either as an automatic function or upon request by the personnel for such a report. As another example, the indicator may be an electronic message directed to a particular person or entity responsible for the diversity of the two circuits. This electronic message may be effective in immediately calling attention to the diversity violation so that it may be resolved more quickly.

Returning to the query operation 416, if the processor 103 finds that there are no matches of the synchronization leads, then the processor 103 checks for additional locations in common between the first and second circuits of the diverse pair at a query operation 418. If additional common locations are found, then operational flow returns to look-up operation 412. If no additional common locations are found, then operation flow returns to selection operation 410.

In the present example of FIGS. 2 and 3, one can see that another common location exists between C-1 and C-2, namely, CO-8. Furthermore, it can be seen that both C-1 and C-2 utilize item 1 at CO-8. In this case, C-1 and C-2 also share the synchronization lead SL-1 of item 1. Therefore, an indicator may also be output for this violation of diversity due to a shared synchronization lead. However, this violation is a special case in that the item of equipment is shared between the two circuits of the diverse pair. Thus, there is additional potential for a diversity problem here since even if the synchronization lead does not fail, some other aspect of item 1 of CO-1 could fail and cause both circuits to fail. Therefore, a separate search for items of equipment that are in common by the diversity server 102 would also discover this diversity violation and an appropriate indicator would be output to indicate that the two circuits share a common item of equipment.

FIG. 5 shows an example of a graphical user interface 500 that displays a list of circuits 502 that are subject to diversity, such as C-1 and C-2. The list 502 includes a first column 504 which is a list of the circuit identifiers, generally referred to as the CAC. The circuit identifiers as shown are more typical identifiers than the simplified C-1 and C-2 labels. A second column 506 specifies a more detailed identification for the circuit. The list 502 of this example is organized by circuit type, e.g., CCS7, E911 Message, and E911 Special.

A control is provided to allow violations of diversity for a given circuit to be displayed. In this particular example, the control is the circuit identifier of the column 504 in the form of a hyperlink 508. Upon selection of the hyperlink 508, a list 510 is displayed to provide all of the items of equipment where a diversity violation has occurred for the circuit corresponding to the selected hyperlink 508.

The list 510 of this example includes several columns as well. A first column 512 contains another control 524 for each violation in the form of another hyperlink. Selection of the control 524 serves to remove the violation from the list. This selection may be made by personnel upon reviewing the violation and determining that it should be excluded from the present view for one of various reasons. For example, it may be that correcting the violation is currently too costly in terms of finances or time or that the diversity violation is currently being addressed by circuit rearrangements that have been planned and will soon be implemented. Upon selecting the exclude control 524, an option may be presented to the user to allow the user to specify a period of time during which this violation will be excluded so that upon expiration of that period, the violation will reappear in the list 510. Another purpose for an exclusion may be to exclude a reported violation that is not really a violation where the system is unable to make that determination due to the system lacking information that is available to the technician choosing to do the exclusion.

A second column 514 contains a flag value which provides a number assigned to a known diversity violation and thus represents whether a diversity violation is present. A third column 516 contains an equipment identifier value for the item. A fourth column 518 contains a line type provided by the item of equipment, and a fifth column 520 provides a more specific item identifier in association with an identifier of the facility where the item of equipment is located. Thus, personnel can quickly see the information needed to make decisions regarding if, when, and how to resolve the diversity violations.

An additional control 522 may be provided for the list 510. This control 522 may be selected by a user to expand the list to include items of equipment for the selected circuit that do not involve violations in addition to those items of equipment that are involved in a diversity violation. Selecting the control 522 again filters the list to only include those items of equipment that are involved in a diversity violation. This may be beneficial to a user to visualize what items are also in use by the circuit that are not involved in a violation such as when determining what changes might be desirable to alleviate the violations.

Figure 6:
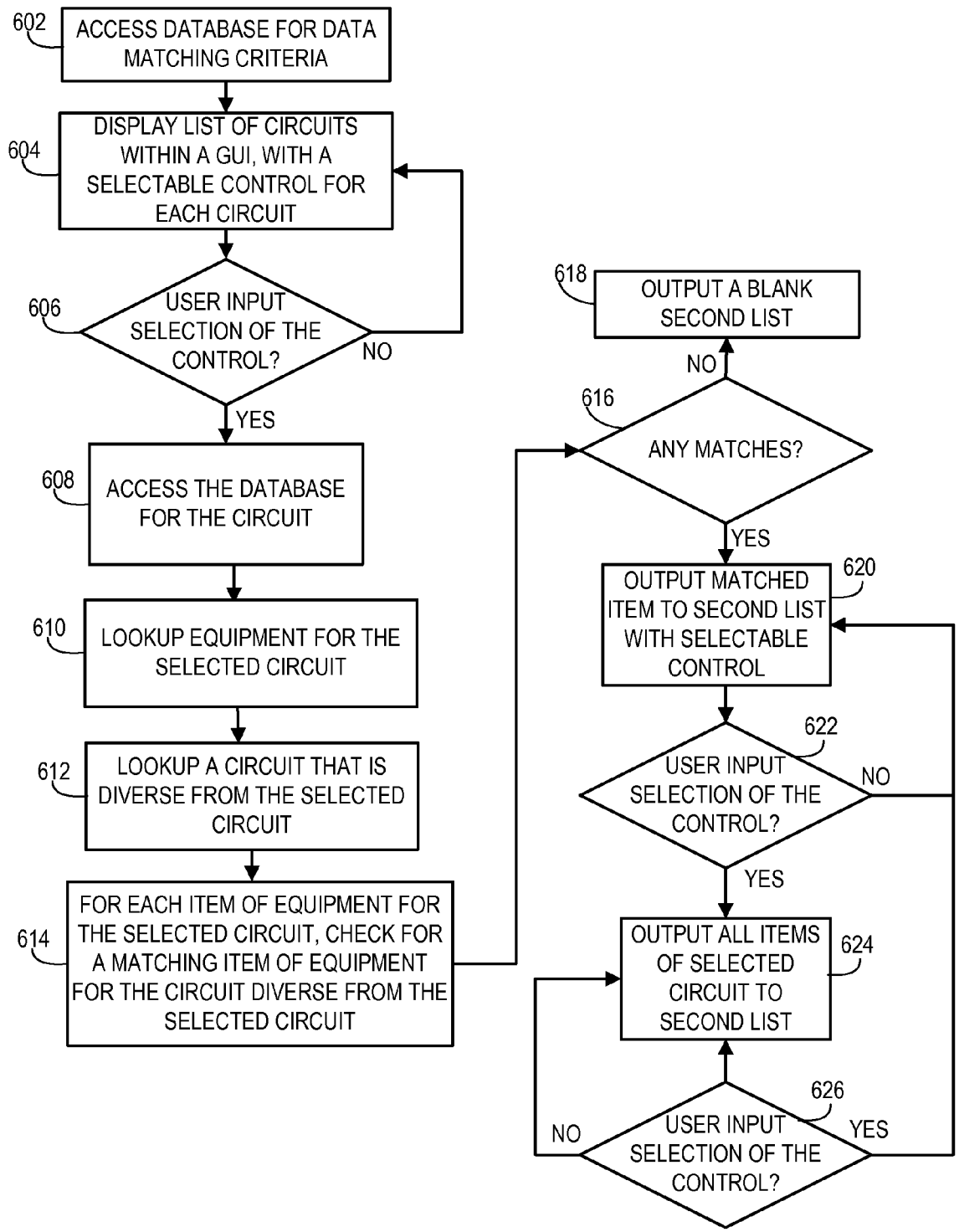
FIG. 6 shows an example of logical operations that may be performed to display a list of violations existing for a user selected circuit according to various embodiments.

FIG. 6 shows an example of the logical operations being performed by the processor 103 of the diversity server 102 to provide the graphical user interface display 500 of FIG. 5. The logical operations begin by the processor 103 accessing the circuit diversity database 104, or other database such as one of the regional circuit databases, to obtain the data that matches search criteria specified by a user to find circuits of interest at a data operation 602. The processor 103 then displays the list of circuits 502 within the graphical user interface 500 with the selectable control 508 for each circuit being displayed at a display operation 604.

The processor 103 then monitors for whether a user has selected the control 508 at a query operation 606. The processor 103 then accesses the database 104 again at a data operation 608 upon detecting that the user has selected the control 508. In this example, the processor 103 then looks up the equipment for the selected circuit within the accessed data at a look-up operation 610. Further in this example, the processor 103 then looks up a circuit that is defined as being diverse from the selected circuit at a look-up operation 612. The processor 103 looks up this information in order to determine the violations at this time. It will be appreciated that the processor 103 may look-up such information and determine diversity violations as background operations and then have the violations stored in advance of the request in other examples.

Returning to this example, upon the processor 103 having looked up the information about the circuit defined as being diverse from the selected circuit, then for each item of equipment for the selected circuit, the processor 103 then checks for a matching item of equipment for the circuit defined as being diverse at a check operation 614. Referring to FIG. 3, where C-1 has been selected from the list 502, the processor 103 finds that C-1 utilizes item 1 of CO-8 and also finds that C-2 utilizes item 1 of CO-8.

At a query operation 616, the processor 103 then detects whether any matches have been found. In the case of the data of FIG. 3, a match has been found. In the case of the circuit selected in FIG. 5, many matches have been found. The processor 103 then displays the items of equipment that match both circuits in the second list 510 at a display operation 620. If no matches have been found, then a blank list may be displayed at a display operation 618. The operational flow may then resume back at a previous operation such as the display operation 604 where the query operation 606 then awaits a selection of a different circuit by the user.

Upon displaying the list 510, the processor 103 then begins to detect whether the control 522 for expanding the list to all items of equipment for the selected circuit has been selected at a query operation 622. Upon detecting that the control 522 has been selected, then the processor 103 displays all items of equipment within the list 510 at a display operation 624. The processor 103 then again monitors for selection of the control 522 at query operation 626. Upon selection of the control 522, the processor 103 then re-displays the list 510 with only those items of equipment involved in diversity violations at the display operation 620.

Figure 7:
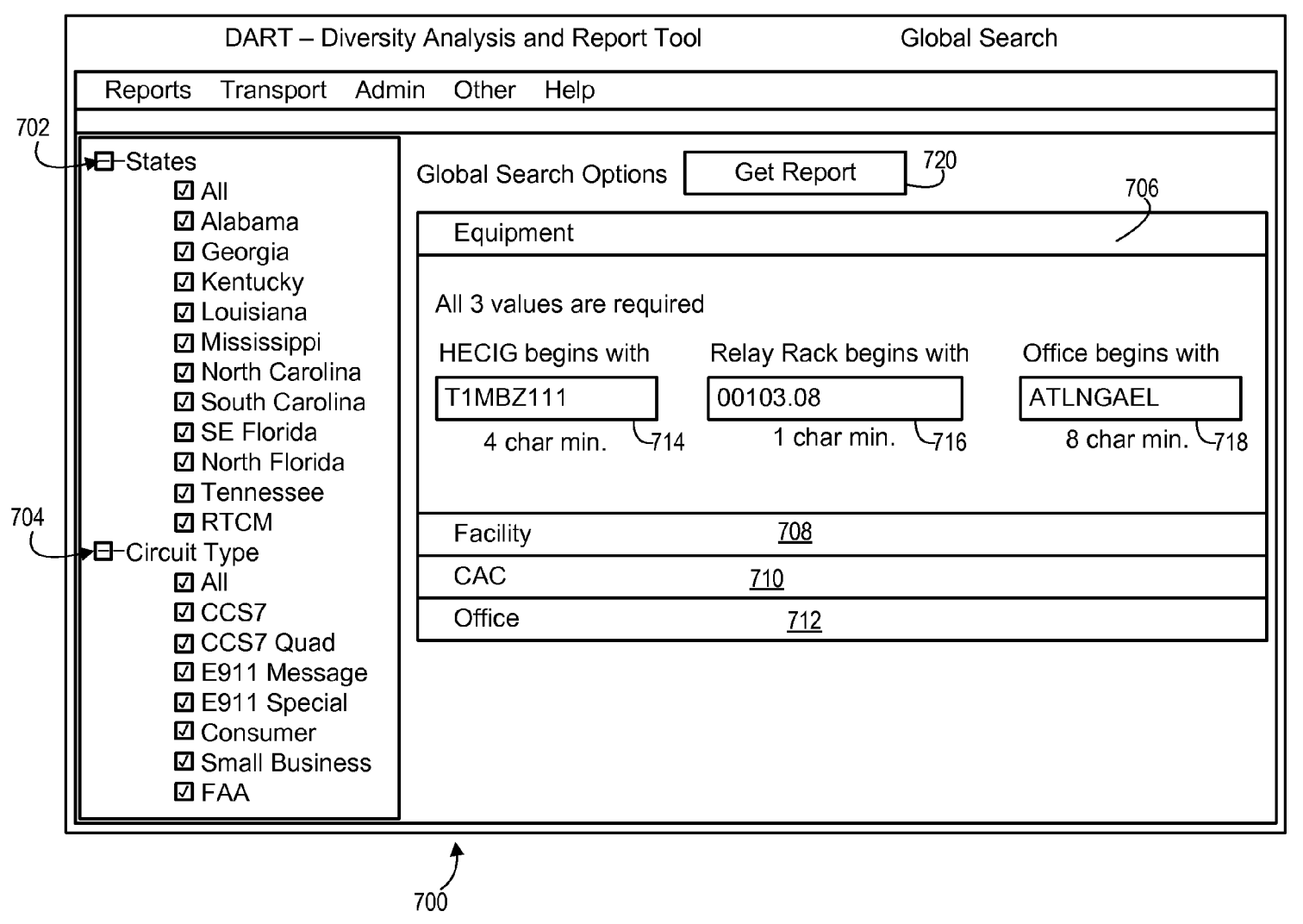

FIG. 7 shows another example of a graphical user interface 700. This graphical user interface 700 may be used to receive search criteria from a user in order to search for circuits of interest that require diversity. The result of such a search may be displayed within a list of a graphical user interface such as the list 502 of the graphical user interface 500 of FIG. 5.

The graphical user interface 700 may include a list 702 of areas to include in the search which are states in this example. Furthermore, the graphical user interface 700 includes a list 704 of circuit types to include in the search. The user may uncheck those states and circuit types that are not to be included in the results.

According to exemplary embodiments, the graphical user interface 700 also specifies different categories of search associated with search tabs. A first search tab 706 is associated with a search by equipment type. A second search tab 708 is associated with a search by a facility type. A third search tab 710 is associated with a search by a circuit identifier. A fourth search tab 712 is associated with a search by an office location. Depending upon which tab is selected, a user is presented with search fields customized to that category.

In the example shown, the user has selected to search by equipment type and three search fields 714, 716, and 718 are presented. The first search field 714 may receive data specifying the type of equipment to consider, where the type may be referred to as the Human-interface Equipment Catalog Item Group (HECIG). The second search field 716 may receive data specifying the information identifying the relay rack, or set of relay racks, to consider. The third search field 718 may receive data specifying the office location, or set of office locations, to consider. In these search fields 714, 716, 718, the number of characters may be truncated to some degree so that a set of corresponding results are found. For example, specifying only 3 characters for the office rather than specifying all characters for an office name may result in a collection of offices that match those 3 characters being searched rather than one office.

Fields that may be presented for receiving data for a facility type search may include one or more of a facility type, an A Common Language Location Identifier (CLLI), a Z CLLI, and can select to flip the A/Z CLLI. Fields that may be presented for receiving data for a circuit identifier search may include at least the CAC value or a portion thereof. Fields that may be presented for receiving data for an office search may include one or more of the CLLI specified for all parts of the circuit path, A CLLI and Z CLLI if the CLLI input is at the beginning or end of the circuit path, and/or limit to intermediate offices if the CLLI is in the circuit path but not at the A or Z end. Upon receiving all of the information the user wishes to utilize for the search, the user may then select a search button 720 to initiate the search for matching circuits.

Figure 8:
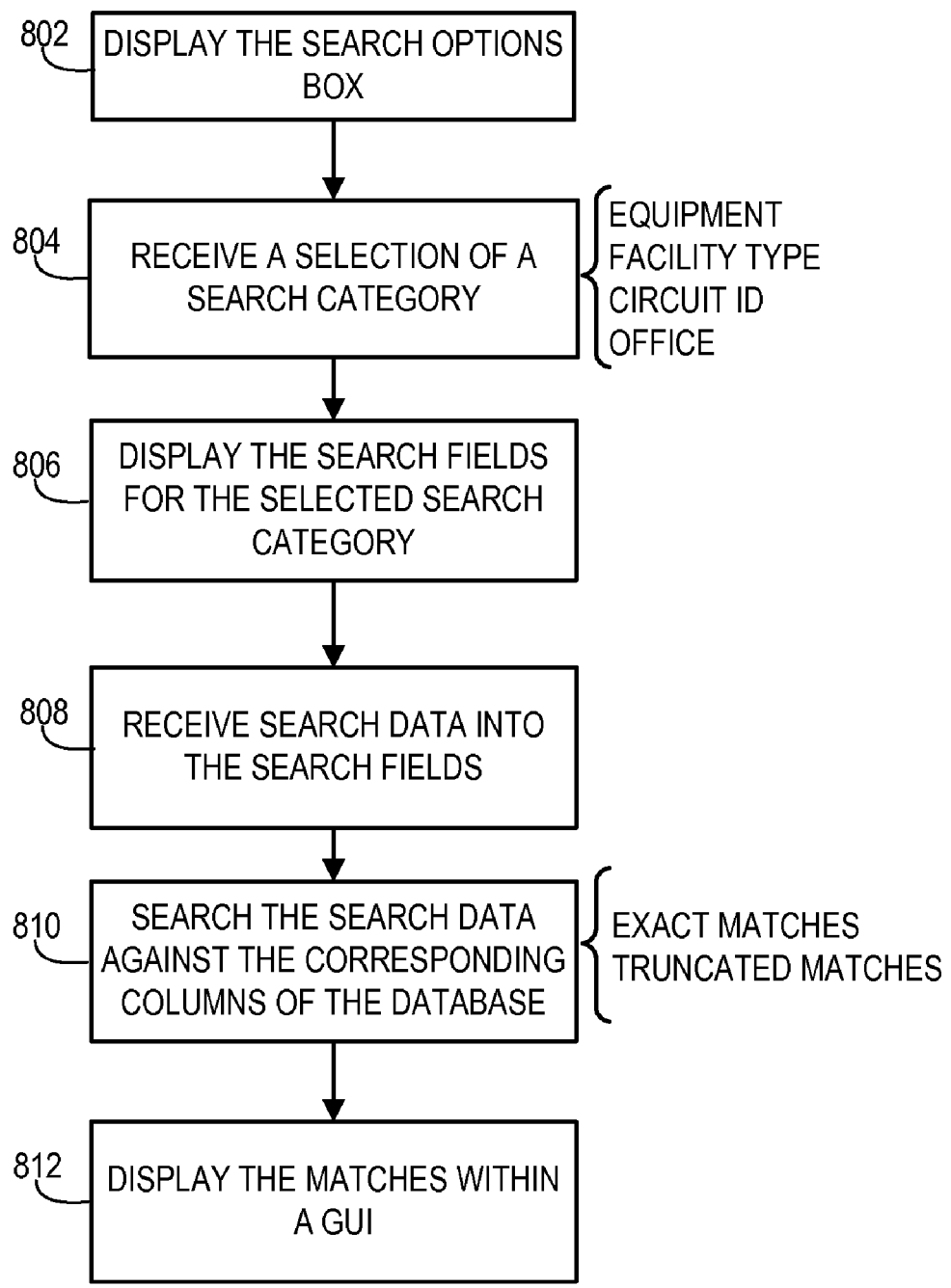
FIG. 8 shows an example of logical operations that may be performed to provide a search of communications circuits subject to diversity based on user selectable criteria according to various embodiments.

FIG. 8 shows an example of logical operations that may be performed by the processor 103 of the diversity server 102 when providing the graphical user interface 700 for receiving the search category and related field information and then completing the search. The processor 103 displays a box with all of the search options at a display operation 802, including the tabs 706, 708, 710, 712 for selecting the category and fields, such as the fields 714, 716, 718, corresponding to the selected category.

The processor 103 receives a selection of a search category at an input operation 804, such as by selection of one of the category tabs 706, 708, 710, or 712. The processor 103 then displays the search fields, such as the fields 714, 716, 718, for the selected search category at a display operation 806. The processor 103 then receives search data into the search fields at an input operation 808. The processor 103 then searches the received search data against the corresponding columns of the diversity database 104 or other external databases such as the regional circuit databases at search operation 810. As discussed above in relation to FIG. 7, the search fields may receive truncated data rather than a complete number of characters so that a larger set of data is searched. Alternatively, a full number of characters to describe a specific item, office, and so forth may be specified so that an exact match is the only result of the search.

Upon searching the database, the matching circuits that are found are then displayed within the graphical user interface at display operation 812. This display may correspond to the list 502 of circuits shown in FIG. 5. At this point, the operational flow may terminate or may await the user to return to the search options display of display operation 802. As an alternative, the set of logical operations discussed above in relation to FIG. 6 may become active whereby the user may then select a circuit from the list in order to see specific information about the diversity for that selected circuit as is discussed above.

Figure 9:
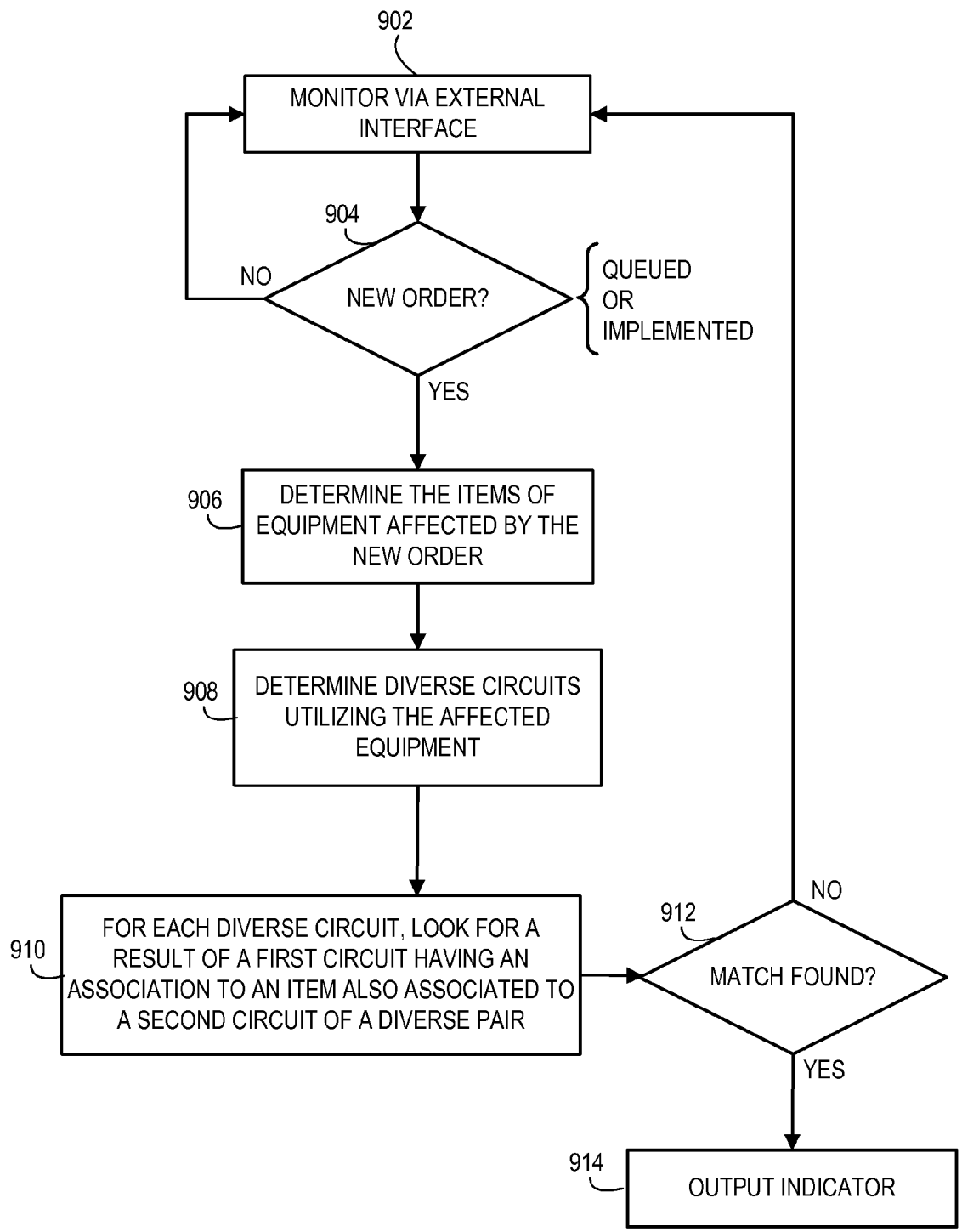
FIG. 9 shows an example of logical operations that may be performed to monitor for diversity violations created by new orders according to various embodiments.

FIG. 9 shows an example of logical operations that may be performed by the processor 103 of the diversity server 102 to detect effects of new orders for circuits that implicate existing circuits that require diversity. When a new order is placed, such as to add a new circuit, cancel a circuit, enhance a circuit, and so forth, changes may be made in the telecommunications network that affect other circuits as well. For example, a new item of equipment may be needed to replace an existing one to accommodate a new circuit at a facility. As another example, a circuit may need to be moved to another item of equipment so that a particular item of equipment can accommodate a new circuit that has been ordered.

While such changes may not affect the functionality of the existing circuits being affected, these changes may result in diversity violations. For example, an existing first circuit may need to be moved from one item of equipment to another at a given facility. An existing second circuit that should be diverse from the existing first circuit may be present on an item of equipment at the same facility. The existing first circuit may be moved to the item of equipment already hosting the existing second circuit. While the first circuit may continue to function normally, the change has resulted in a common point of potential failure between the first and second circuits.

The logical operations begin by the processor 103 monitoring via an external interface whether a new order exists at a monitoring operation 902. In one example, the processor 103 is concerned with new orders that have already been implemented. In another example, the processor 103 is concerned with new orders that have been queued for implementation. The processor 103 detects whether such new orders have occurred at a query operation 904.

Upon the processor 103 detecting that a new order has occurred, the processor 103 may then determine what items of equipment are being affected by the new order at an analysis operation 906. The processor 103 may do so by examining information that has been generated by the order tracking server 144 that will be utilized by the regional circuit servers 108, 114, and 120 to implement the changes. As another example, the processor 103 may do so by examining information that has been stored by the regional circuit servers 108, 114, and 120 in their corresponding databases to implement those changes.

The processor 103 determines which diverse circuits are utilizing the affected equipment at a look-up operation 908 by looking up the determined items of equipment in the diversity database 104 to find those circuits associated to those items. The processor 103 then looks for whether a result of the new order is that a first circuit of a diverse pair is associated with an item of equipment that is also associated with a second circuit of the diverse pair at analysis operation 910. In that case, the result of the new order is a diversity violation.

The processor 103 detects whether such a result has occurred at a query operation 912. If no such result has occurred, then the processor 103 resumes monitoring for other new orders. However, if such a result has occurred, the processor 103 outputs an indicator of the diversity violation impacting the diverse circuits at output operation 914. This indicator may then trigger personnel to make adjustments to restore the diversity between the impacted circuits. The operational flow returns to continue monitoring for new orders at the monitoring operation 902.

This output indicator may be of various forms as discussed above in relation to FIG. 4. For example, the indicator may be a flag that is output to the diversity database 104 to flag the first and second circuits as having at least one diversity violation due to at least one common potential point of failure that has been detected. The violation of diversity may then be reported to personnel as discussed above, either as an automatic function or upon request by the personnel for such a report. As another example, the indicator may be an electronic message directed to a particular person or entity responsible for the diversity of the two circuits. This electronic message may be effective in immediately calling attention to the diversity violation so that it may be resolved more quickly.

Figure 10:
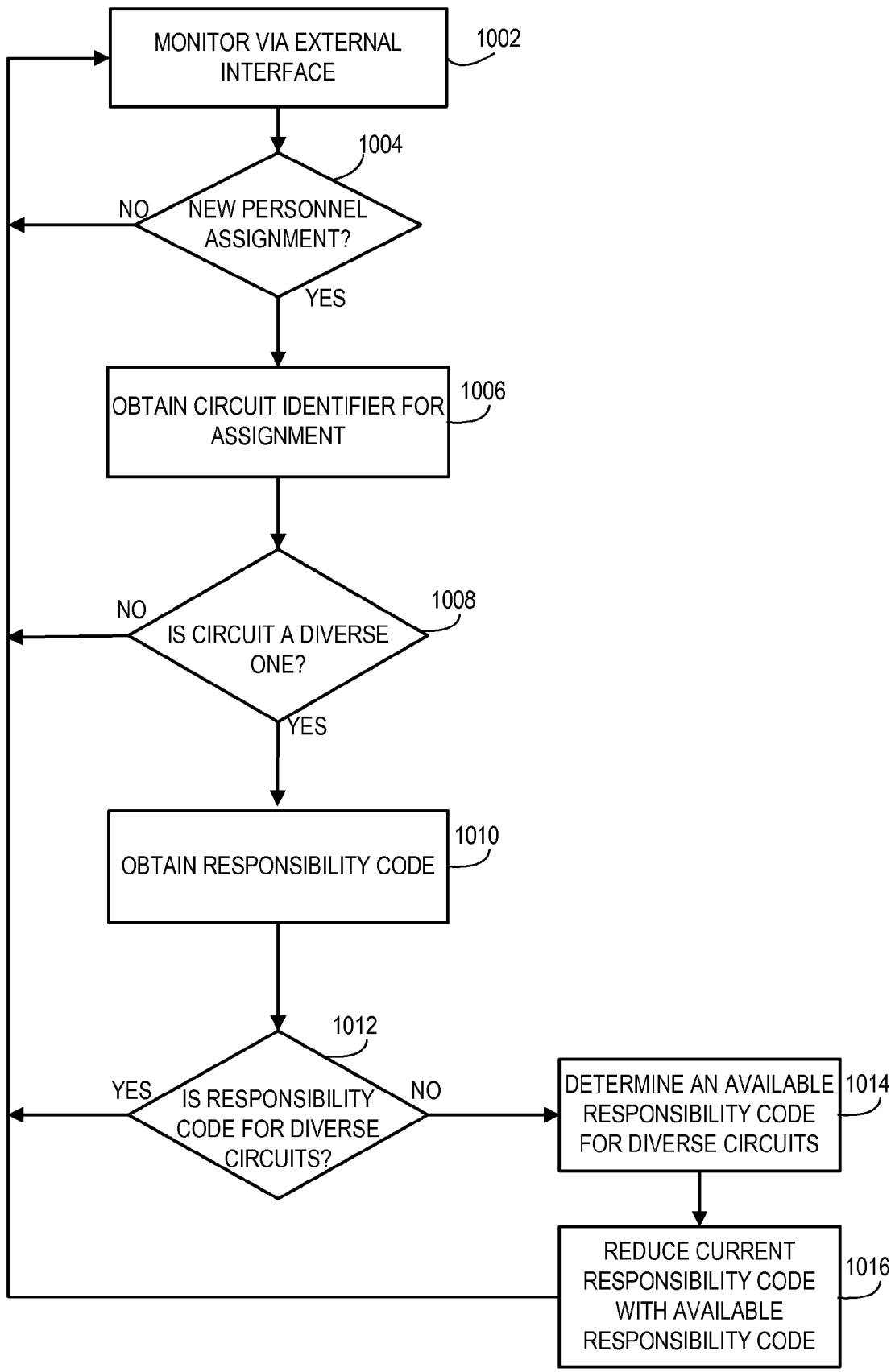
FIG. 10 shows an example of logical operations that may be performed to find personnel assignment violations related to diverse circuits according to various embodiments.

FIG. 10 shows an example of logical operations that may be performed by the processor 103 of the diversity server 102 in order to find improper assignments of personnel responsible for monitoring diversity circuits. As there are many circuits in a telecommunications network that do not require diversity, there may be many personnel that are trained to monitor circuits that are not required to be diverse but are not adequately trained to monitor those circuits that do require diversity. These personnel are referred to herein as non-diversity personnel. When new circuits are introduced, the personnel assignment server 146 may assign an available person to monitor that circuit by load balancing among available personnel. The personnel assignment server 146 may not account for whether a circuit requiring a personnel assignment is a circuit that also requires diversity. In that case, the personnel assignment server 146 may mistakenly assign a non-diversity person to monitor a diversity circuit, and that may give rise to unresolved diversity violations.

The logical operations begin by the processor 103 monitoring via an external interface whether a personnel assignment has occurred at a monitoring operation 1002. In one example, the processor 103 is concerned with new assignments that have already been implemented. In another example, the processor 103 is concerned with new assignments that have been queued for implementation. The processor 103 detects whether such new assignments have occurred at a query operation 1004.

Upon detecting that a new assignment has occurred, the processor 103 then obtains the circuit identifier for the new assignment at an identifier operation 1006. The processor 103 then detects whether the corresponding circuit is a diverse one or not at a detect operation 1008. If not, then monitoring for others continues. If so, then the processor 103 obtains a responsibility code associated with the circuit at a code operation 1010. The processor 103 then detects whether the responsibility code is for diverse circuits or not at a query operation 1012. According to exemplary embodiments, the responsibility code corresponds to a person responsible for monitoring the circuit and further identifies the person as a diversity person or a non-diversity person. The diversity database 104 may maintain a list of the responsibility codes that are for diverse persons.

If the responsibility code indicates that a diversity person is already assigned to the circuit, then monitoring for new assignments resumes. If the responsibility code indicates that a non-diversity person is assigned to the circuit, then the processor 103 may either attempt to resolve the conflict or may request a resolution by the personnel assignment server 146. Where the processor 103 attempts to resolve the conflict, the processor 103 determines an available responsibility code for diverse circuits at a code operation 1014. This may be done by looking up the list of responsibility codes and then attempting to load balance among them or by assigning one of those codes without regard to load. The list may maintain a number of circuits being monitored by each code and the processor 103 may select the code with the least number being monitored or with a number being monitored that is less than a threshold.

Upon finding an appropriate responsibility code, the processor 103 then replaces the current responsibility code with an available responsibility code at a replacement operation 1016. The processor 103 may perform the replacement by writing directly into the personnel assignment database, or alternatively by requesting that the personnel assignment server 146 write the replacement into the database. The operational flow may then proceed by continuing to monitor for new personnel assignments back at the monitoring operation 1002.

As discussed above, embodiments provide for the additional maintenance of diversity among circuits by monitoring for such things as synchronization leads in common, changes resulting in diversity violations due to new orders being placed, and for improper assignments of responsible personnel. Furthermore, as discussed above, embodiments provide for the additional maintenance of diversity by providing reporting of diversity violations within a graphical user interface including controls for selecting circuits to review. Additionally, embodiments provide for searching of circuits subject to diversity requirements based on categories and various information fields in order to find those circuits of interest and view any diversity violations that may exist for them.

While embodiments have been particularly shown and described, it will be understood by those skilled in the art that various other changes in the form and details may be made therein without departing from the spirit and scope of the invention.

What is claimed is:

1. A non-transitory computer readable medium containing instructions thereon for performing acts to assist in maintaining diversity for telecommunications services, the acts comprising:
   tracking an association of each item of telecommunications equipment to a plurality of telecommunications circuits;
   determining whether a first circuit and a second circuit of a diverse pair of the plurality are both associated to a same item of equipment;
   displaying within a graphical user interface a list of the plurality of telecommunications circuits and a control for each circuit in the list to show circuit details;
   receiving a selection of a first control for the first circuit;
   in response to receiving the selection, displaying a list of the items of equipment that are associated to both the first and second circuits;
   displaying within the graphical user interface a second control for the list of the items of equipment to restrict the list to the items of equipment that are associated to both the first and second circuits or to all of the items of equipment that are associated with the first circuit; and
   displaying within the graphical user interface a third control for the list of the items of equipment to remove an item of equipment from the list without moving the item of equipment.

2. The computer readable medium of claim 1, wherein the acts further comprise presenting an option for specifying a period of time during which the item of equipment will be removed from the list, wherein upon expiration of the period of time, the item of equipment is returned to the list.

3. The computer readable medium of claim 1, wherein the acts further comprise:
   tracking an association of each synchronization lead to a plurality of telecommunications circuits;
   determining whether the first circuit and the second circuit of the diverse pair of the plurality are both associated to a same synchronization lead; and
   producing an output indicator that represents whether the first circuit and the second circuit of the diverse pair are both associated to the same synchronization lead.

4. A method of maintaining diversity for telecommunications services, comprising:
   tracking an association of each item of telecommunications equipment to a plurality of telecommunications circuits, including tracking at least one of equipment types, facility types, circuit identifiers, and office locations;
   determining whether a first circuit and a second circuit of a diverse pair of the plurality are both associated to same items of equipment;
   receiving search criteria within a graphical user interface, the search criteria including at least one of equipment type, facility type, circuit identifier, and office location; and
   displaying within the graphical user interface a list of the plurality of telecommunications equipment that correspond to the search criteria, the list including the first and the second circuits, wherein the display indicates which items of equipment are associated to both the first and second circuits, and wherein displaying the list comprises:
      displaying a control for each circuit in the list to show details;
      receiving a selection of a first control for the first circuit;
      in response to receiving the selection, then indicating which items of equipment are associated to both the first and second circuits by displaying a list of the items of equipment that are associated to both the first and second circuits;
      displaying a second control for the list of the items of equipment to restrict the list to the items of equipment that are associated to both the first and second circuits or to all of the items if equipment that are associated with the first circuit; and
      displaying a third control for the list of the items of equipment to remove an item of equipment from the list without moving the item of equipment.

5. The method of claim 4, wherein the acts further comprise presenting an option for specifying a period of time during which the item of equipment will be removed from the list, wherein upon expiration of the period of time, the item of equipment is returned to the list.

6. The method of claim 4, wherein receiving the search criteria comprises receiving at least a portion of at least one of the equipment type, facility type, circuit identifier, and office location and wherein displaying the list comprises including the telecommunications circuits that match the portion that is received.

7. A computer system for maintaining diversity for telecommunications services, comprising:
   a storage device containing associations of items of equipment to a plurality of telecommunications circuits that include a first circuit and a second circuit of a diverse pair;
   an interface to an external system that tracks orders for telecommunications circuits; and
   a processor that monitors the external system via the interface to detect new orders for circuits other than the first and second circuits wherein the new orders result in changes to the association of the items of equipment to the first and second circuits of the diverse pair, to detect whether the changes resulting from the detected new orders create an association of a first item of equipment to both the first and second circuits, and to output an indicator that the new order creates an association of the first item of equipment to both the first and second circuits, wherein the processor further:

presents for display a list of the plurality of telecommunications circuits and a control for each circuit in the list to show circuit details;

receives a selection of a first control for the first circuit;

in response to receiving the selection, presents for display a list of the items of equipment that are associated to both the first and second circuits;

presents for display a second control for the list of the items of equipment to restrict the list to the items of equipment that are associated to both the first and second circuits or to all of the items of equipment that are associated with the first circuit; and presents for display a third control for the list of the items of equipment to remove an item of equipment from the list without moving the item of equipment.

8. The computer system of claim 7, wherein the processor monitors the external system for orders that have been implemented.

9. The computer system of claim 7, wherein the processor monitors the external system for orders that are queued for implementation.

10. The computer system of claim 7, wherein the external system tracks an association of personnel responsible for monitoring to telecommunications circuits to be monitored, wherein the personnel includes diversity personnel responsible for monitoring circuits that require diversity and non-diversity personnel responsible for monitoring circuits that do not require diversity, and wherein the processor monitors the association of the personnel to the first and second circuits detects when a non-diversity person is associated with either the first or second circuits, and upon detecting the association of the non-diversity person to the first or second circuits, changes the association to replace the non-diversity person with a diversity person.

11. The computer system of claim 10, wherein the personnel are represented by a responsibility code that indicates whether each person is a diversity person or a non-diversity person, and wherein the processor replaces the responsibility code of the non-diversity person with the responsibility code of the diversity person.

12. The computer system of claim 7, wherein the processor further presents an option for specifying a period of time during which the item of equipment will be removed from the list, wherein upon expiration of the period of time, the item of equipment is returned to the list.

* * * * *